United States Patent [19]

Kashiwagi

[11] Patent Number: 5,238,786
[45] Date of Patent: Aug. 24, 1993

[54] METHOD FOR MANUFACTURING HIGH RECORDING DENSITY OPTICAL DISK

[75] Inventor: Toshiyuki Kashiwagi, Tokyo, Japan

[73] Assignee: Sony Corporation, Tokyo, Japan

[21] Appl. No.: 583,204

[22] Filed: Sep. 17, 1990

[30] Foreign Application Priority Data

Sep. 20, 1989 [JP] Japan .................................. 1-244463

[51] Int. Cl.$^5$ .............................................. G03F 7/00
[52] U.S. Cl. ..................... 430/321; 430/323; 430/495; 430/945; 156/659.1; 369/285
[58] Field of Search ............... 430/321, 320, 495, 270, 430/323, 311, 945, 5, 272; 156/659.1; 369/279, 277, 285

[56] References Cited

U.S. PATENT DOCUMENTS

| | | | |
|---|---|---|---|
| 4,152,726 | 5/1979 | Kojima et al. | 369/279 |
| 4,417,331 | 11/1983 | Takaoka et al. | 369/111 |
| 4,729,940 | 3/1988 | Nee et al. | 430/323 |
| 4,762,396 | 8/1988 | Dumant et al. | 430/5 |
| 4,778,747 | 10/1988 | Ohta et al. | 430/321 |
| 4,947,384 | 8/1990 | Suzuki et al. | 369/279 |
| 5,008,176 | 4/1991 | Kondo et al. | 430/272 |

FOREIGN PATENT DOCUMENTS 0168763 1/1986 European Pat. Off. .
WO86/06203 10/1986 PCT Int'l Appl. .

OTHER PUBLICATIONS

Applied Optics, vol. 21, No. 11, Jun. 1, 1982 L. F. Johnson, "Optical Writing of Dense 1000-Å Features in Photoresist", pp. 1892 and 1893.
Patent Abstracts of Japan, vol. 10, No. 22, p. 424, Jan. 28, 1986; Mikio Takeshima, "Manufacture of Stamper for Optical Disk".

Primary Examiner—Marion E. McCamish
Assistant Examiner—Janis L. Dote
Attorney, Agent, or Firm—Hill, Steadman & Simpson

[57] ABSTRACT

A mastering method for making a high recording density optical disk is disclosed, in which a substrate with a photosensitive material layer is selectively exposed to a focused laser light having a predetermined power representing information to be recorded. The laser power is such that the exposed width at the top surface of the photosensitive material layer is larger than the exposed width at the bottom surface of the photosensitive material layer. After the development of the layer, the remaining photosensitive material layer is used as an etching mask for the substrate to form pits in the substrate.

3 Claims, 5 Drawing Sheets

METHOD FOR MANUFACTURING HIGH RECORDING DENSITY OPTICAL DISK

BACKGROUND OF THE INVENTION

The present invention relates to a method for manufacturing a high recording density optical disk and, more particularly, to a mastering technique for a high recording density optical disk.

Generally, in mastering an optical disk to form pits therein, it is customary to employ a technique of selectively exposing a layer of photosensitive material (photo-resist), which is provided on a glass substrate, to laser light in conformity with record information, and, after a developing step, removing the exposed portions of the layer.

According to such a technique, the shape of the pit is determined by the spot diameter of the laser light irradiated to the resist surface, the distribution of the laser light intensity, and the photosensitivity characteristics of the resist material. In general, the pit thus formed is sectionally trapezoidal in such a manner as to be narrow at the bottom surface of the resist (glass substrate surface) and to be wide at the opposite surface of the resist (top surface of the resist layer).

Such a trapezoidal shape is derived from the fact that the intensity distribution of the laser light is represented by a normal hill-like curve, and the spread at the foot of such an intensity distribution curve causes an increase of the pit width. The pit width is substantially equal to the laser light diameter and is determined by the aperture number NA of an objective lens and the wavelength $\lambda$ of the laser light. The pit width is given by an expression $0.82 \times \lambda/NA$. Therefore, the spot diameter is minimized merely to 0.4 $\mu$m even by using the shortest wavelength ($\lambda = 442$ nm) among the laser light presently available in the mastering, while collimating such light at the highest aperture number NA ($=0.9$). In the case of an optical disk, the spot diameter of the reproducing laser light is not so small and practically it is about 1.2 $\mu$m, so that actual recording is performed with pits of 0.5 to 0.6 $\mu$m in width.

However, with recent technical progress, there has been developed a compact and lightweight laser ($\lambda = 532$ nm). If an optical system equipped with such a short-wave laser is rendered practically usable, it necessitates a recording technique an the order of $\frac{1}{4}$ micron on the recording side, to consequently bring about a disadvantage that the present optical disk manufacturing process fails to comply with the requirements.

OBJECT AND SUMMARY OF THE INVENTION

It is an object of the present invention to provide an improved high-density optical disk manufacturing method which is capable of forming micro pits smaller than the spot diameter determined by the optical system and thereby attaining further enhancement in the recording density.

According to one aspect of the present invention, there is provided a method for manufacturing a high recording density optical disk, in which a photosensitive material layer formed on a substrate is exposed to a focused laser light having such power as to form an exposed portion having a width at the top surface of the photosensitive material layer larger than a width at the bottom surface of the photosensitive material layer after the development, the photosensitive material layer being used as an etching mask to form pits in the substrate.

BRIEF DESCRIPTION OF THE DRAWINGS

FIGS. 1(a) through 1(j) are enlarged partial sectional views respectively illustrating the steps in manufacture of a high-density optical disk by the method of the present invention, in which FIG. 1(a) shows the step of forming a first layer and a second layer; FIG. 1(b) shows the step of exposing the second layer; FIG. 1(c) shows the step of developing the second layer; FIG. 1(d) shows the step of etching the first layer; FIG. 1(e) shows the step of forming a metal master; FIG. 1(f) shows the step of forming a mother; FIG. 1(g) shows the step of producing a stamper; FIG. 1(h) shows the step of producing a disk base; FIG. 1(i) shows the step of forming a metal film; and FIG. 1(j) shows the step of forming a protective film;

DESCRIPTION OF THE PREFERRED EMBODIMENTS

According to the high recording density optical disk manufacturing method contrived to achieve the above object, the disk is produced by initially forming, on a substrate, a first layer which is non-sensitive to laser light and a second layer which is sensitive to the laser light; then selectively exposing and developing the second layer in conformity with record information in such a manner that the width of each aperture at the end face thereof on the side of incidence of the laser light becomes greater than the width of the aperture at the boundary between the first and second layers; and thereafter etching the first layer while using the second layer as a mask.

Figure 2A:
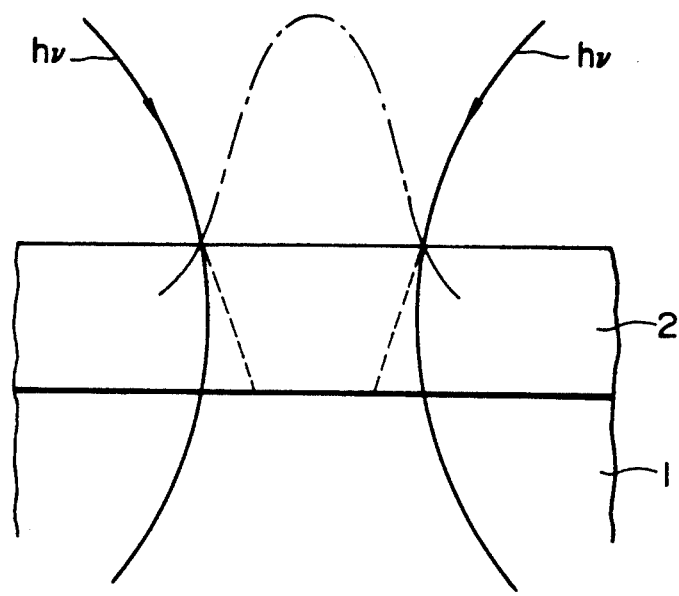
FIG. 2(a) typically illustrates the intensity distribution characteristics of laser light.

Normally when laser light hv is collimated and irradiated to a resist layer 2 on a glass substrate 1, the laser light hv is so distributed as shown in FIG. 2(a). In this case, the intensity distribution of the laser light hv becomes hill-like as represented by a one-dot chain line. The region exposed to be developable under such conditions is enclosed with a broken line in FIG. 2(a), wherein the shape thereof conforms with the intensity distribution of the laser light hv.

Figure 2B:
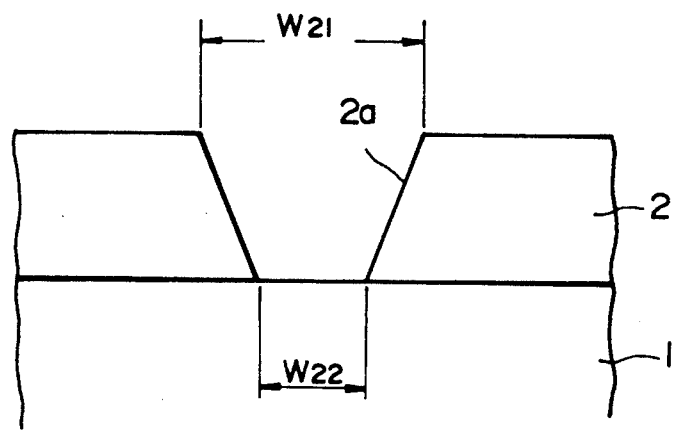
FIG. 2(b) typically illustrates the shape of an aperture formed in the resist layer by exposure and development.

Therefore, when such a resist layer 2 is developed, an aperture 2a formed in the exposed portion is shaped to be sectionally trapezoidal as illustrated in FIG. 2(b), wherein the aperture width $w_{21}$ at the end face on the side of incidence of the laser light becomes greater than the aperture width $w_{22}$ at the boundary between the resist layer 2 and the glass substrate 1.

Accordingly, a desired exposure conforming with the laser light output can be executed by changing the laser light output having such intensity distribution characteristics.

Figure 3A:
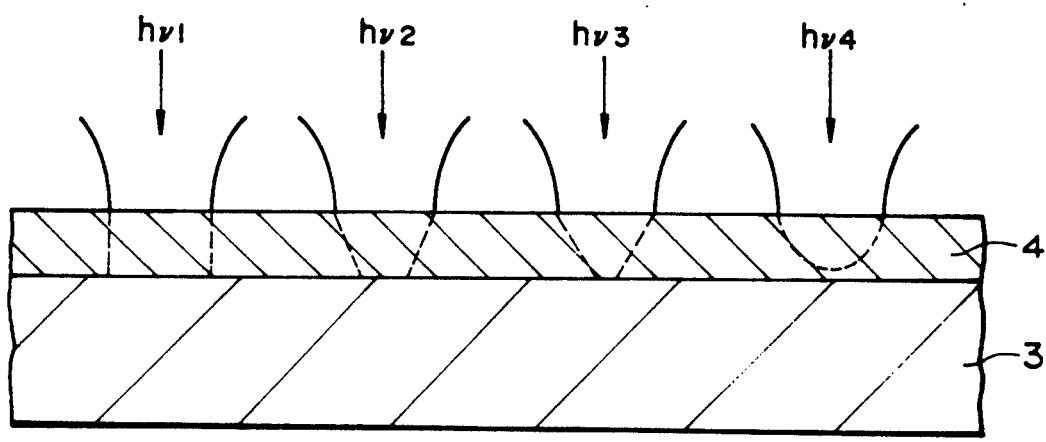
FIG. 3(a) is an enlarged partial sectional view of a substrate in a state of exposure with changes in the laser light output.

More specifically, as illustrated in FIG. 3(a), the laser light hv irradiated to a resist layer 4 on a glass substrate 3 is changed to hv1, hv2, hv3 and hv4 in such a manner that the output thereof becomes gradually smaller rightward in the drawing.

Each of the laser light outputs hv1, hv2, hv3, hv4 is so irradiated as to have a spot diameter of 0.4 μm of the surface of the resist layer 4.

Figure 3B:
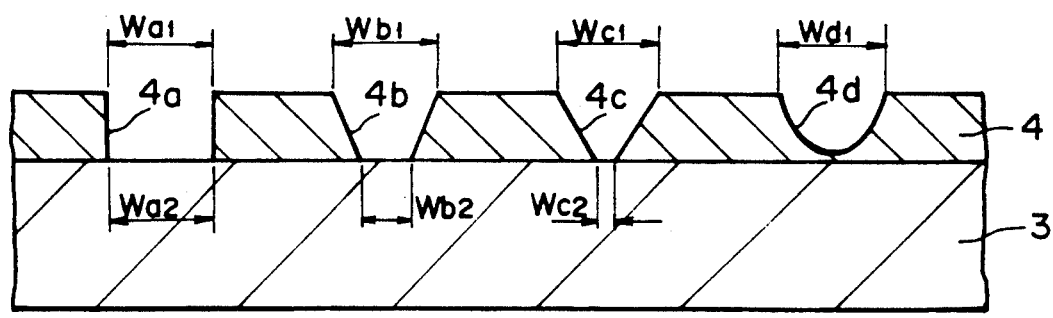
FIG. 3(b) is an enlarged partial sectional view of the substrate developed after exposure to the laser light.

Subsequently, when the exposed resist layer 4 is developed, as illustrated in FIG. 3(b), an aperture 4a formed in the layer portion exposed to the highest output is so shaped that the aperture width $w_{a1}$ at the end face on the side of incidence of the laser light hv1 becomes substantially equal (0.4 μm) to the aperture width $w_{a2}$ at the boundary adjacent to the glass substrate 3. Meanwhile, with regard to apertures 4b and 4c formed in the two intermediate portions in FIG. 3(b) exposed to the gradually lowered laser light outputs hv2 and hv3, the respective aperture widths $w_{b1}$ and $w_{c1}$ at the end faces on the side of incidence of the laser light outputs hv2 and hv3 become smaller than the aperture widths $w_{b2}$ and $w_{c2}$ at the boundary adjacent to the glass substrate 3. For example, when each of the aperture widths $w_{b1}$ and $w_{c1}$ at the end faces on the side of incidence of the laser light outputs hv2 and hv3 is 0.4 μm, the aperture widths $w_{b2}$ and $w_{c2}$ at the boundary adjacent to the glass substrate 3 are 0.2 μm and 0.1 μm, respectively. As for an aperture 4d formed in the layer portion exposed to the lowest output, the developable exposed region obtained by the laser light hv4 fails to reach the glass substrate 3, so that the aperture width wd1 at the end face on the side of incidence of the laser light hv4 becomes 0.4 μm, but the aperture 4d is not open to the glass substrate 3.

The present invention utilizes the characteristics that if the spot diameter of the laser light is maintained constant on the surface of the resist layer as described above, each aperture can be formed in a different shape depending on the laser light output, wherein a step of exposure is executed with control of the laser light output in such a manner that the width of each aperture formed upon development of the second layer becomes greater at the end face thereof on the side of incidence of the laser light than the width at the boundary between the first and second layers.

More specifically, when a pit is formed by the present invention using a substrate where a first layer non-sensitive to laser light and a second layer sensitive to the laser light are sequentially deposited, initially the second layer is selectively exposed in conformity with record information in such a manner that the width of an aperture at the end face thereof on the side of incidence of the laser light becomes greater than the aperture width at the boundary between the first and second layers. A developing step is executed thereafter.

As a result, in the second layer there is formed the aperture where the width at the end face thereof on the side of incidence of the laser light is greater than the width at the boundary between the first and second layers.

Subsequently the first layer is etched with the remaining second layer being used as a mask.

Then, in the first layer, a pit corresponding to the aperture width is formed at the boundary between the aperture and the first layer.

Hereinafter an exemplary embodiment of the high-density optical disk manufacturing method of the present invention will be described with reference to the accompanying drawings.

Figure 1A:
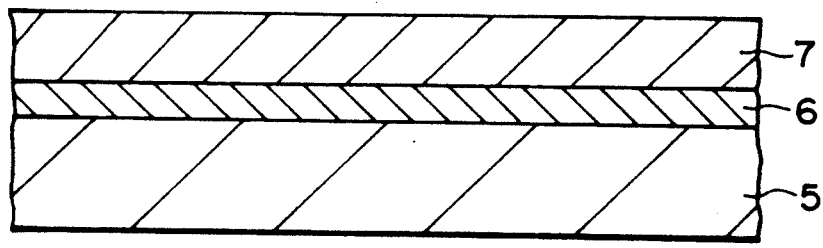

In producing a high-density optical disk, first, as shown in FIG. 1(a), a chromium layer having a thickness of 600 to 900Å (thickness determined by Å/4N of the reproducing wavelength) is formed as a first layer 6 on a substrate 5 composed of glass and having a polished surface.

Since the first layer 6 is used to form pits therein, it is necessary that the first layer 6 is not sensitive to laser light when a second layer 7 is exposed in a subsequent step. And it is also necessary that the first layer 6 is not dissolved, during development of the second layer 7, with a solvent such as acetone which is used to remove the resist. A suitable material capable of meeting such requirements is chromium, for example. However, an adequate material may be used on condition that it can satisfy the above requirements.

Thereafter a positive photosensitive resist material layer having a thickness of 500 to 1500Å is formed as a second layer 7 on the first layer 6.

Since the second layer 7 serves as a mask at the time of etching the first layer 6, it is composed of a selected material sensitive to the laser light. A suitable material is a photosensitive resist, for example.

Figure 1B:
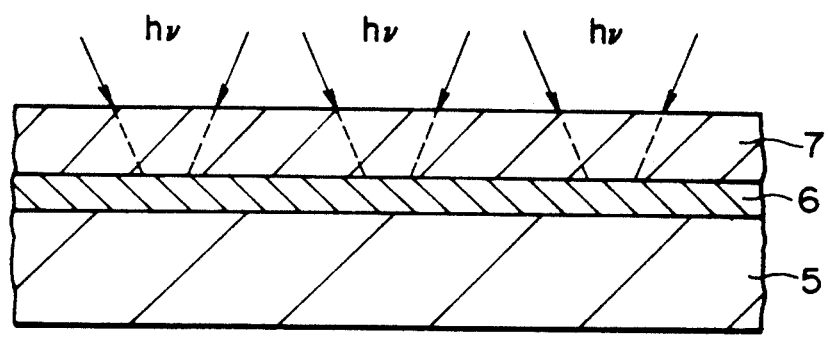
Figure 1C:
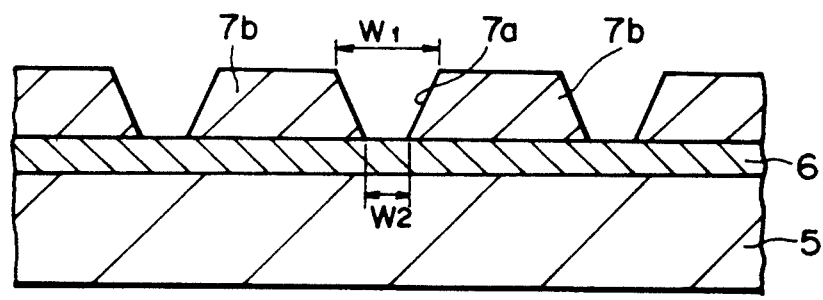

Next, as shown in FIG. 1(b), the second layer 7 is selectively exposed in conformity with record information while controlling the output of the laser light hv in such a manner that, after a development, the width $w_1$ of an aperture 7a at the end face thereof on the side of incidence of the laser light becomes greater than the width $w_2$ at the boundary adjacent to the first layer 6.

The laser light hv in this embodiment is so controlled that its spot diameter becomes 0.4 μm on the surface of the second layer 7.

Subsequently a latent image formed on the second layer 7 is developed and the exposed portions are removed.

As a result, a sectionally trapezoidal aperture 7a is formed in the portion exposed to the laser light hv in such a manner that the aperture width $w_1$ at the end face on the side of incidence of the laser light is greater than the aperture width $w_2$ at the boundary adjacent to the first layer 6.

In this embodiment, the width $w_2$ of the aperture 7a at the boundary adjacent to the first layer 6 was less than 0.4 μm.

In a next step, the first layer 6 is etched by using, as a mask, the second layer 7b left after the development.

Figure 1D:
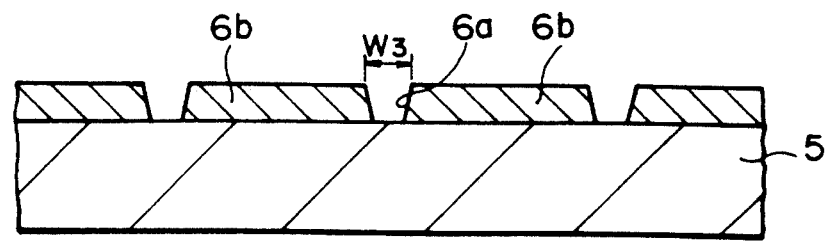

Consequently, at the position corresponding to the aperture 7a in the second layer 7, there is formed, as shown in FIG. 1(d), an aperture 6a or a pit having a width $w_3$ which is smaller than the width $w_2$ of the aperture 7a at the boundary adjacent to the first layer 6, i.e., the width $w_2$ of the aperture 7a at the boundary between the second layer 7 and the first layer 6.

Subsequently the second layer 7b left as a mask is removed, so that there is formed, between the remaining first layer portions 6b on the substrate 5, an aperture 6a which has a width $w_3$ smaller than the width $w_2$ of the aperture 7a at the boundary between the second layer 7 and the first layer 6.

In this embodiment, the width $w_3$ of the aperture 6a at the end face thereof on the side of the second layer 7 was less than 0.4 mm.

Thereafter a desired optical disk is manufactured by the known technique with production of a master, a stamper and so forth.

Figure 1E:
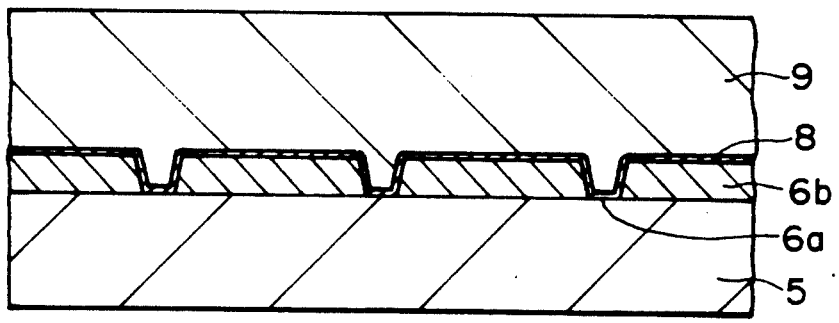

For example, as shown in FIG. 1(e), the substrate 5 is plated with silver to form a metal layer 8 for facilitating separation of a plated layer 9 mentioned hereafter, and further electroless plating is executed to form the layer 9.

Figure 1F:
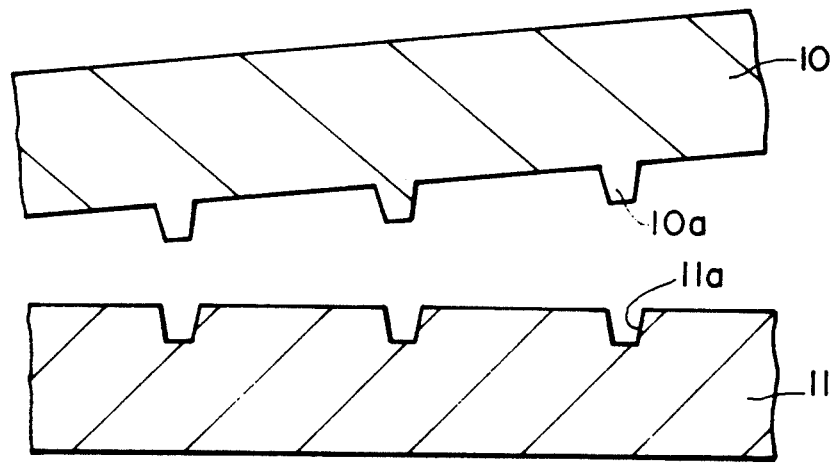

Subsequently, as shown in FIG. 1(f), the plated layer 9 is separated from the substrate 5 to produce a metal mask 10. In this step, the aforementioned metal layer 8 is also separated simultaneously.

As a result, the pits formed in the substrate 5 are copied to the metal master 10, so that projections 10a are formed on the metal master 10 at positions corresponding to the pits.

Thereafter, as shown in FIG. 1(f) a mother 11 is produced by the use of such a metal master 10.

As a result, the projections 10a formed on the metal master 10 are copied to the mother 11, whereby recesses 11a are formed at the positions corresponding to the projections 10a.

Figure 1G:
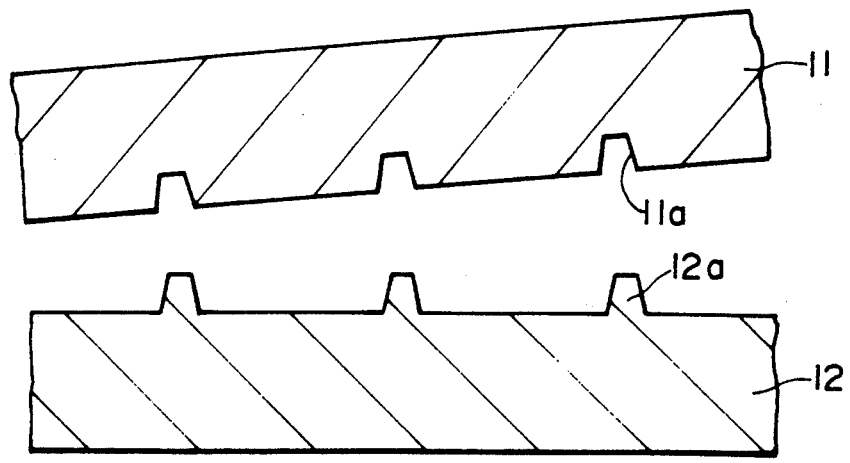

In a next step, as shown in FIG. 1(g), a stamper 12 is produced by the use of such mother 11.

Consequently, the recesses 11a formed in the mother 11 are copied to the stamper 12, whereby projections 12a are formed thereon at the positions corresponding to the recesses 11a.

Figure 1H:
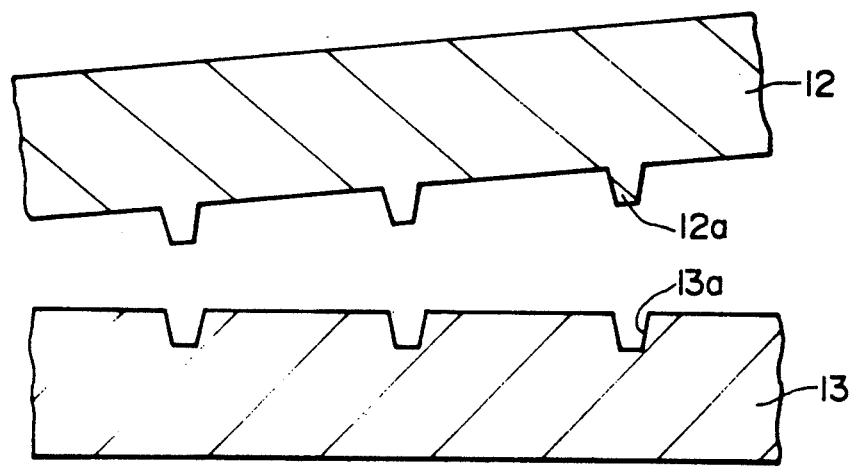

Then, as shown in FIG. 1(h), a disk base 13 is produced by pressing the stamper 12 to a base of acrylic resin, polycarbonate resin or the like.

As a result of such step, recesses 13a are formed as pits in the disk base 13 at the positions corresponding to the projections 12a formed on the stamper 12.

Figure 1I:
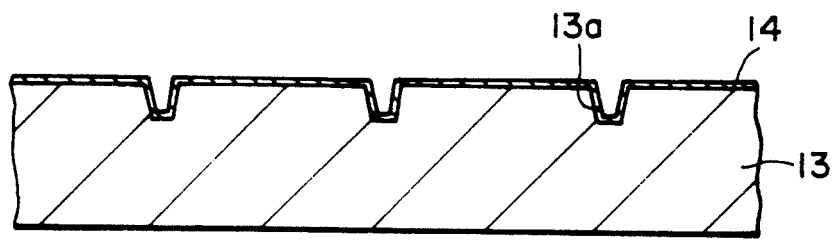

In a next step, as shown in FIG. 1(i), a metal film 14 of aluminum or the like is formed as a reflecting film on the disk base 13 inclusive of the pits.

Figure 1J:
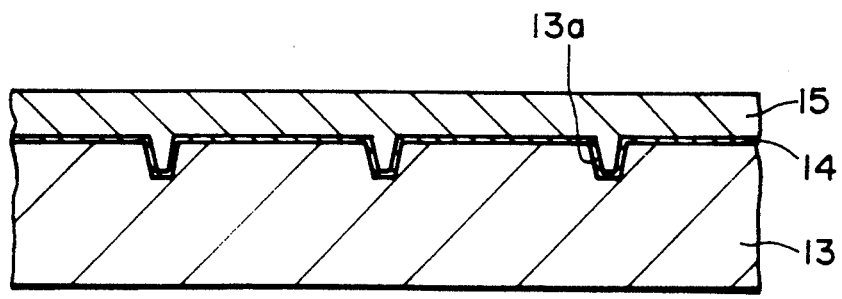

And finally, as shown in FIG. 1(j), a protective film 15 of resin or the like is formed on the metal film 14 to thereby complete a desired high-density optical disk.

Thus, in this embodiment, a chromium layer is interposed between the substrate and the resist layer, and the laser light output is so controlled that the width of each aperture formed upon development of the resist layer becomes greater at the end face thereof on the side of incidence of the laser light than the width at the boundary adjacent to the chromium layer. In this manner the resist layer is selectively exposed and developed, and the chromium layer is etched with the remaining resist layer used as a mask. Therefore it becomes possible to obtain desired pits each having a width even smaller than the spot diameter of the laser light determined by the optical system.

Consequently, the present invention eliminates the complicated operation required heretofore in the conventional method when determining the pit width by changing the setting of the optical system, and also achieves another advantage of preventing any nonsymmetry or deformation of the pit that may be derived from an erroneous setting of the optical system.

In addition, the method of the present invention is capable of simply changing the pit width in a real-time mode during the exposure under proper control of the laser light output by utilizing the intensity distribution characteristics of the laser light.

In the above method the chromium layer is provided between the substrate and the photosensitive resist material layer. However, the photosensitive resist material layer may be directly formed on the glass substrate, and the glass surface can be etched by using the exposed and developed resist material layer as the etching mask.

As is apparent from the description given hereinabove, the method of the present invention employs, in forming a pit, a substrate on which a layer non-sensitive to laser light and another layer sensitive to the laser light are sequentially deposited, wherein selective exposure and development are executed by utilizing the intensity distribution characteristics of the laser light and the output dependency thereof, and then the layer non-sensitive to the laser light is etched with the sensitive layer used as a mask. Therefore a desired pit can be formed in a extremely small width less than the spot diameter determined by the optical system.

It follows that, in the optical disk manufactured by the method of the present invention, the pit width can be reduced to consequently realize a high recording density.

Furthermore, according to the method of the present invention, the pit width is not determined by the optical system, so that it becomes possible to eliminate the necessity of any complicated operation required heretofore to change the setting of the optical system, and also possible to prevent any nonsymmetry or deformation of the pit that may otherwise be induced by erroneous setting of the optical system.

In addition, the method of the present invention ensures another advantage that the pit width is changeable by a simplified operation of adjusting the laser light output, and such pit width change can be performed during the exposure in a real time mode.

Although various minor changes and modifications might be proposed by those skilled in the art, it will be understood that I wish to include within the claim of the patent warranted hereon all such changes and modifications as reasonable come within my contribution to the art.

I claim as my invention:

1. A method for manufacturing a high recording density optical disk, comprising the steps of:
    a) providing a substrate,
    b) forming a first layer on said substrate which is not sensitive to a laser light, and a photosensitive material second layer on said first layer,
    c) selectively exposing said photosensitive material second layer to a focused laser light representing an information to be recorded and having a selected predetermined power to form exposed portion having a width at a top surface of said photosensitive material second layer which is larger than width at a bottom surface of said photosensitive material second layer, a difference of said widths being determined by said selection of said predetermined power,
    d) removing said exposed portions to form apertures through which a surface of said first layer is exposed,
    e) etching said first layer to form pits therein by using remaining portions of said photosensitive material layer as an etching mask, a top surface width of said bits being smaller than a spot diameter of said focused laser light on a top surface of said second layer when said second layer is selectively exposed, and
    f) using the pits in said first layer to produce a metal mask which is then used to make a stamper to make optical disks.

2. A method according to claim 1 wherein said first layer is formed of chromium.

3. A method for manufacturing a high recording density optical disk, comprising the steps of:
    a) providing a substrate,
    b) forming a first layer on said substrate which is not sensitive to a laser light, and a photosensitive material second layer on said first layer, c) selectively exposing said photosensitive material layer to a focused laser light representing an information to be recorded having a selected predetermined power to form exposed portions having a first width at a top surface of said photosensitive material second layer which is larger than a second width at a bottom surface of said photosensitive material second layer, a difference of said widths being determined by said selection of said predetermined power, d) removing said exposed portions to form apertures having said first and second width at a top and bottom, respectively, through which a surface of said first layer is exposed, e) etching pits in said first layer by using remaining portions of said photosensitive material layer as an etching mask, a third width at a top of said pit at a top surface of said first layer being less than said second width, and f) using the pits in said first layer to produce a metal mask which is then used to make a stamper to make optical disks.

* * * * *